3,561,816
VEHICLE CANOPY
Kevin Errol Koch, Unley Park, South Australia, Australia (4 Ford Ave., Torrens Park, South Australia, Australia 5062)
Filed May 13, 1968, Ser. No. 728,556
Int. Cl. B62d 25/06
U.S. Cl. 296—102                    5 Claims

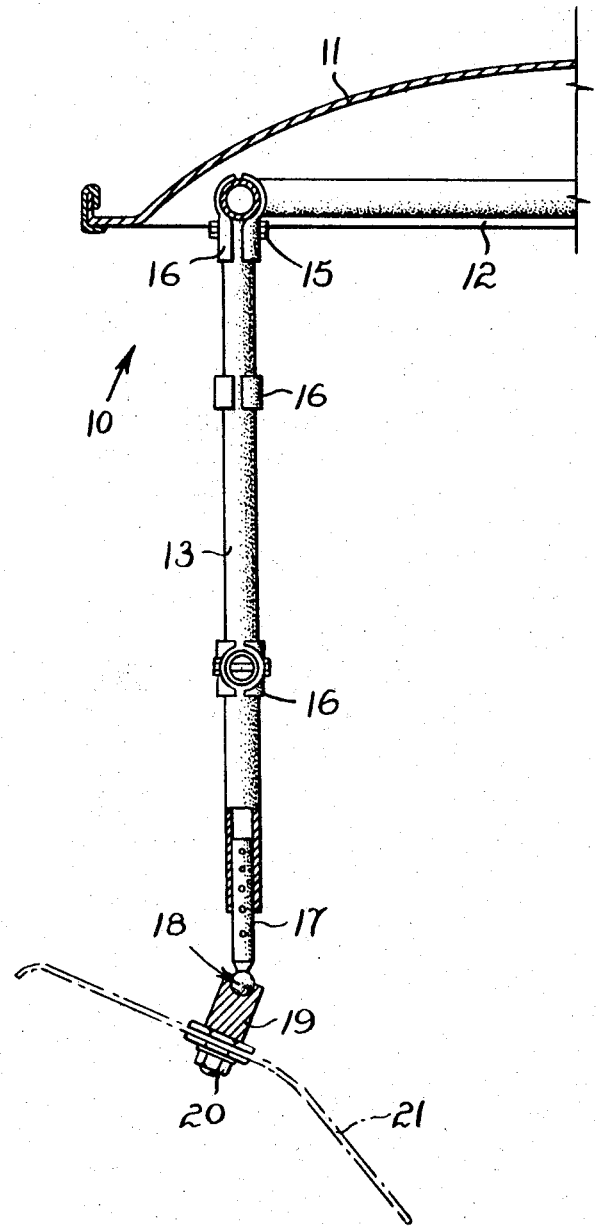

ABSTRACT OF THE DISCLOSURE

A vehicle canopy having a top member, a frame and support members, the frame having posts with extension members, support members depending from the extension members, and universally movable securing means securing the support members to respective extension members, so that the canopy can be fitted to vehicles of various shapes and sizes.

---

This invention relates to a vehicle canopy.

It is already known to provide tractors and other vehicles with canopies which protect the driver from the sun or rain.

The construction of canopies has associated with it problems due to the many forms of tractors and vehicles on which canopies are to be fitted, which vary considerably in constructional details and therefore make it necessary to provide different mountings for different tractors.

The object of this invention is to provide an improved canopy which will be usable on a large range of vehicles, the canopy being constructed according to this invention so that the support members are adjustable to allow a canopy to be fitted to any one of a range of vehicles.

The invention in one of its forms consists of a vehicle canopy having a top member carried by a frame, the frame including posts, support members universally movable on the lower ends of the posts, and attachment means on the support members.

An embodiment of the invention is described hereunder in some detail with reference to the accompanying drawings, in which:

FIG. 2 is a part section (on an enlarged scale) on plane 2—2—2—2 of FIG. 1.

Figure 1:
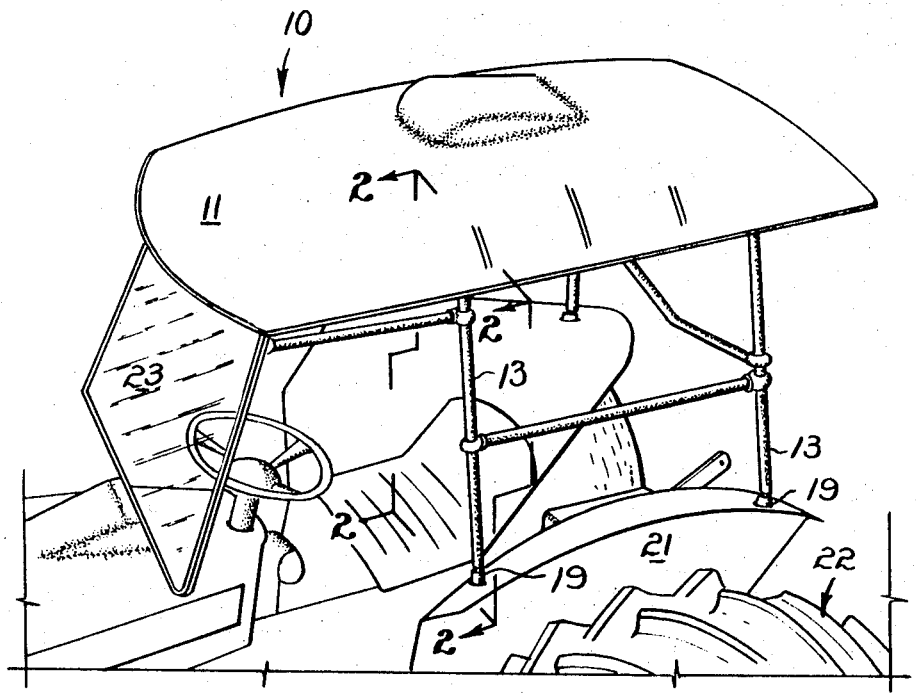
FIG. 1 is a perspective view of a canopy.

According to this embodiment the canopy 10 comprises a top member 11 which is vacuum moulded (or drape formed) from a suitable plastic and has attached to its underside a rectangular tubular frame 12, the tubular frame 12 in turn being carried by four posts 13 which are slidable along the side members of the rectangular frame 12 but which can be locked rigidly thereto by tightening clamping bolts 15 of clamps 16, each of these support posts having at its lower end a telescopic extension member 17 carrying on a ball and socket joint 18, an attachment member 19. The attachment member 19 is provided with a threaded extension 20 so that it can be bolted or attached to the mud guard 21 (or any other suitable part) of a tractor 22 (or similar vehicle), the universal ball and socket joint 18 permitting the angle of attachment to be selected to suit any particular vehicle, the sliding of the support posts on the rectangular frame 12 allowing the best position of each support to be independently selected, the support posts also being rotational on the rectangular frame 12 when the clamping members are loosened so that their angle in relation to the frame can be varied. By adjusting the telescopic extension members 16 the effective height of the frame posts 13 can be varied, this universal motion permitting the support posts to be located at the most convenient position where they will suit any one of a range of tractors or vehicles. However, when the support posts are clamped to the rectangular frame a rigid structure results.

The top member is provided with reinforcing corrugations and a ventilator may also be provided in the top where such is required.

The top member 11 also supports a wind screen 23 (if such is desired) or a wind screen or wind deflectors could be attached to the supports, the universal arrangement providing a unit which is extremely simple to adapt to any particular type of tractor or vehicle and permitting a standard canopy to be manufactured which can be adjusted to suit the particular tractor or the like to which it is to be fitted, tightening up of the various clamping members between the supports and the frame however resulting in a final rigid structure in which the canopy can be held in any selected relationship with respect to the driver of the vehicle.

The top member is of dish configuration with its edges depending somewhat and by positioning the frame with its supporting posts within this dished portion, the whole assembly can be folded into the space required for the top and therefore the unit can be readily packaged in a relatively small space.

What I claim is:

1. A canopy adapted for being mounted on a vehicle, said canopy comprising a top member, a frame, and four support members adapted for connection with the vehicle at four selected nonlinear spaced locations, said frame comprising an upper frame portion of rectangular shape and tubular section secured to the underside of the top member, four posts each slidably and pivotable mounted on said upper frame portion for being secured to the upper frame portion at a selected position and attitude, clamps for locking said posts to said upper frame portion, extension members depending from respective posts in telescopic relation therewith, means for adjustably securing the extension members to the respective posts, and universally movable means securing the support members to respective extension members whereby the canopy is supportable from the vehicle at said four separate locations.

2. A vehicle canopy according to claim 1 wherein said universally movable means are constituted by ball and socket joints.

3. A vehicle canopy according to claim 1 further comprising attachment means constituted by threaded extensions on respective support members.

4. A vehicle canopy according to claim 1 wherein said top member is of dish shape and said upper frame portion is accommodated within said dish shape such that the frame and support members can be folded within the confines of the top member.

5. A vehicle canopy according to claim 4 comprising a screen supported from said frame at the front edge of the top member.

References Cited
UNITED STATES PATENTS

| | | | |
|---|---|---|---|
| 459,862 | 9/1891 | Wood | 296—102 |
| 578,649 | 3/1897 | Mass | 135—7 |
| 602,760 | 4/1898 | Lines | 135—7 |
| 690,342 | 12/1901 | Anderson | 135—7 |
| 1,712,593 | 5/1929 | Tucker | 296—102 |
| 2,714,387 | 8/1955 | Meldrum | 296—102 |
| 3,095,034 | 6/1963 | Francis | 296—95 |
| 3,127,214 | 3/1964 | Kettler | 296—102 |

BENJAMIN HERSH, Primary Examiner

R. R. SONG, Assistant Examiner